(12) United States Patent
Kramer, Jr. et al.

(10) Patent No.: US 8,870,232 B2
(45) Date of Patent: Oct. 28, 2014

(54) COUPLING DEVICE FOR TUBE WITH ANNULAR CORRUGATIONS

(75) Inventors: Vance M. Kramer, Jr., Perrysburg, OH (US); Jonathan O. Rodebaugh, Perrysburg, OH (US)

(73) Assignee: Crushproof Tubing Company, McComb, OH (US)

( * ) Notice: Subject to any disclaimer, the term of this patent is extended or adjusted under 35 U.S.C. 154(b) by 45 days.

(21) Appl. No.: 13/489,105

(22) Filed: Jun. 5, 2012

(65) Prior Publication Data
US 2013/0320671 A1 Dec. 5, 2013

(51) Int. Cl.
*F16L 33/00* (2006.01)
(52) U.S. Cl.
USPC .......................................... 285/242; 285/903
(58) Field of Classification Search
CPC ... F16L 33/2071; F16L 25/0045; F16L 33/22; F16L 37/098
USPC ........................................... 285/903, 242, 319
See application file for complete search history.

(56) References Cited

U.S. PATENT DOCUMENTS

| | | | |
|---|---|---|---|
| 3,669,586 A | 6/1972 | Kramer | |
| 3,705,780 A | 12/1972 | Kramer et al. | |
| 3,809,522 A | 5/1974 | Kramer | |
| 5,267,757 A * | 12/1993 | Dal Palu | 285/148.21 |
| 7,984,931 B2 * | 7/2011 | Kertesz et al. | 285/319 |

* cited by examiner

*Primary Examiner* — Aaron Dunwoody
(74) *Attorney, Agent, or Firm* — Rankin, Hill & Clark LLP

(57) ABSTRACT

The disclosure includes the combination of a flexible rubber tube with annular corrugations and a coupling device for connecting the tube to a fitting. The device includes a latch secured to an end of the tube and a catch associated with the fitting. When the latch is engaged with the catch, the device forces the specially shaped flat annular side wall of the forward most corrugation into surface-to-surface contact with an annular end face of the fitting.

3 Claims, 4 Drawing Sheets

COUPLING DEVICE FOR TUBE WITH ANNULAR CORRUGATIONS

BACKGROUND OF INVENTION

1. Field of Invention

This invention relates to flexible tubing with annular corrugations and especially to a coupling device for connecting an end of such tubing to a fitting. The device includes a latch attached to an end of the tubing and a catch associated with the fitting. More particularly, the invention relates to a unique means for attaching the latch to the end of the tubing.

2. Description of Related Art

Examples of flexible resilient tubing with annular corrugations are shown and described in U.S. Pat. Nos. and 3,669,586, 3,705,780 and 3,809,522, and also in co-pending U.S. patent application Ser. No. 13/489,147, filed Jun. 5, 2012. These references are referred to below and are incorporated by reference herein.

Such tubing is both flexible and resilient and also crush resistant. In addition, the tubing has a wall that defines both internal and external ridges and grooves along at least a portion of its length. In other words, the wall portions that define the annular external ridges, also define on their opposite side, the annular internal grooves. Typical applications for this type of tubing include farm machinery, particularly seeding equipment.

This type of flexible tubing may be made for example, using the methods and apparatus shown and described in the above patents and pending patent application. In general, the process begins with a sleeve of uncured rubber of the desired length, width and wall thickness. The sleeve is placed on a mandrel and an external forming member is placed around the mandrel and sleeve. The forming member has a plurality of annular discs which are connected in various ways to keep them in uniformly spaced relation and to permit the forming member to be axially extended and collapsed to vary the spacing between the discs.

Then fluid pressure is applied between the outer surface of the mandrel and the inner surface of the sleeve to expand portions of the sleeve into the annular spaces between the discs. With the sleeve in this expanded condition, the external form may be axially collapsed or foreshortened with annular wall portions of the sleeve still within the constricted annular spaces between the discs. This causes the radially expanded wall portions of the sleeve to be squeezed in accordion fashion between the discs to form preliminary annular impressions in the uncured rubber.

Next, the fluid pressure is released and the external forming member is axially extended together with the sleeve to permit the sleeve to be removed from the mandrel and external forming member. The resulting sleeve with the preliminary annular impressions formed thereon is placed on a curing mandrel where it is axially foreshortened into an annularly corrugated form with the desired spacing between adjacent corrugations. Finally, the sleeve and the curing mandrel are placed in an oven and heated to cure the sleeve and set the corrugations.

When an annularly corrugated tube of the type described is assembled with associated equipment, it is usually necessary to connect one or both ends of the tube to a fitting with a passage to be aligned with the passage through the tube. To accomplish this, the fitting is typically provided with a flat annular end face and the annular side wall of the forward most ridge on the tube is placed tightly against this face. In order to keep the side wall of the forward most ridge pressed against the end face of the fitting, it is necessary that the end of the tube and the fitting be connected in a tightly latched condition.

Also, in order to assure a tight fit, it is desirable that the respective side wall of the forward most ridge be flat. The normal shape of the ridges and grooves of the corrugations is somewhat sinusoidal in cross section so that the side wall portion is normally curved. The result is that the side wall portion does not make good surface-to surface contact with the end face of the fitting.

The present invention resolves this problem and affords other features and advantages heretofore not obtainable.

BRIEF SUMMARY OF THE INVENTION

The coupling device of the invention is uniquely suited for use with a tube having annular corrugations of the type described. One end of the tube, which will be referred to herein as the "forward end", includes a forward most external ridge and a forward most external groove. The forward most ridge has an annular side wall facing in the direction of the forward end. This side wall will be referred to herein as the "forward side wall".

The coupling device is used to connect the forward end of the tube to a fitting having an annular end face adapted to engage the forward side wall, the device including a latch secured to the forward end of the tube and a catch associated with the fitting. The catch is adapted to receive and retain the latch when the forward side wall is positioned tightly against the annular end face of the fitting.

The latch has a flat disc-like body that defines a circular opening of sufficient size and shape to permit the body to be received and retained in the forward most groove. When the latch is moved into engagement with the catch, the body presses against the side walls of the forward most ridge to urge the forward side wall against the annular end face of the fitting.

In accordance with the invention, the latch is initially positioned on an uncured rubber sleeve that is provided with preliminary annular impressions in the manner described above. After the sleeve is formed in this manner, it is placed in what will become the forward most groove. Then the catch and the latch are moved together into their latched condition. This serves to urge the annular end face of the fitting against the forward side wall of the forward most ridge to flatten the forward side wall while it is still in an uncured condition. After curing is complete, the latch is separated from the catch and the finished tube with the latch thereon is removed from the mandrel.

As a result of this process, the forward side wall remains in a relatively flat condition resulting in an improved surface-to surface engagement with the end face of the fitting.

As another aspect of the invention, the latch has at least two arms located symmetrically about the body and extending in the direction of the forward end of the tube. Each arm has a latching tooth on its outer end extending radially inward. The arms are adapted to move between a radially inward relaxed position and a radially outward flexed position in response to movement of the latch toward the catch. When the latching teeth reach a limit position, the arms are released and move toward their relaxed position bringing the latching teeth into engagement with the catch.

As still another aspect of the invention, the catch has a frusto conical surface that extends from the end face of the fitting back to an annular base wall with an edge that provides a detent for the latching teeth. The frusto conical surface increases in diameter from the end face of the fitting to the rearward base wall so that the latching teeth are forced outwardly as the latch is moved toward engagement with the catch. Then, when the latching teeth reach the edge of the rearward base wall, the arms are released from their flexed condition and bring the latching teeth inwardly into the detent.

As a further aspect of the invention, the body of the latch has an annular recess formed in its side that faces forwardly. The recess is adapted to provide a seat for the adjacent side wall of the forward most ridge. This results in an improved fit between the body of the latch and the forward most ridge and groove.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Referring more particularly to the drawings, there is shown a forward end portion 10 of a flexible rubber tube with annular corrugations and a coupling device for connecting the end portion 10 to a fitting 11 associated with the particular equipment with which the tube is used. The fitting is preferably formed of a relatively hard molded plastic material. The tube may be formed, for example, of EDPM rubber, nitrite rubber or other elastomeric composition depending on the particular application.

Figure 2:
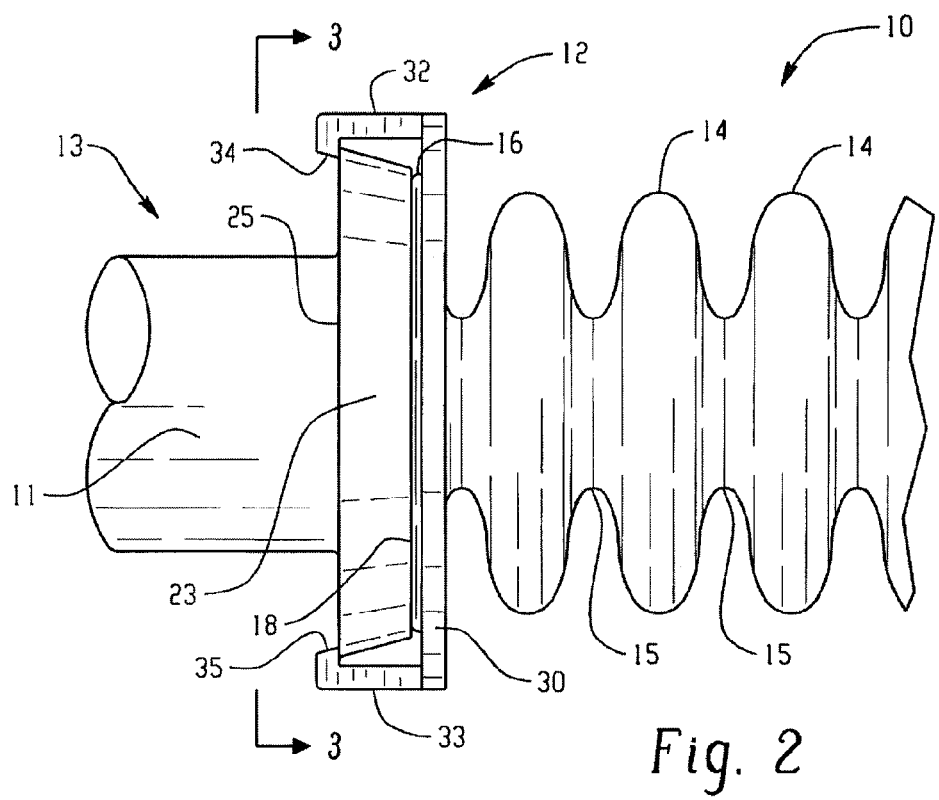
FIG. 2 is a side elevation showing the end portion of the tube connected to the fitting.
Figure 3:
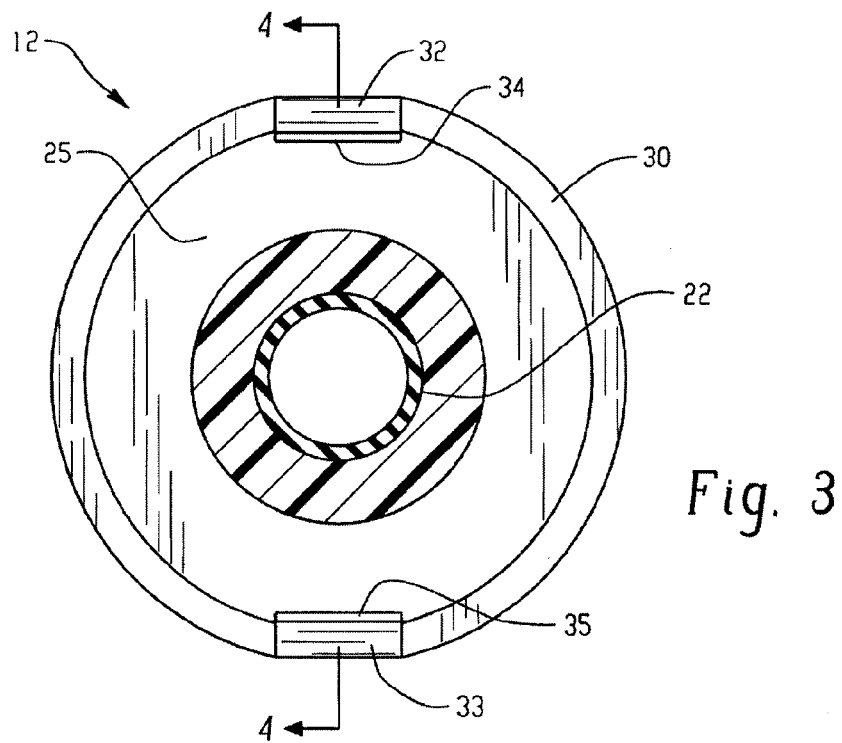
FIG. 3 is a transverse sectional view taken on the line 3-3 of FIG. 2.
Figure 4:
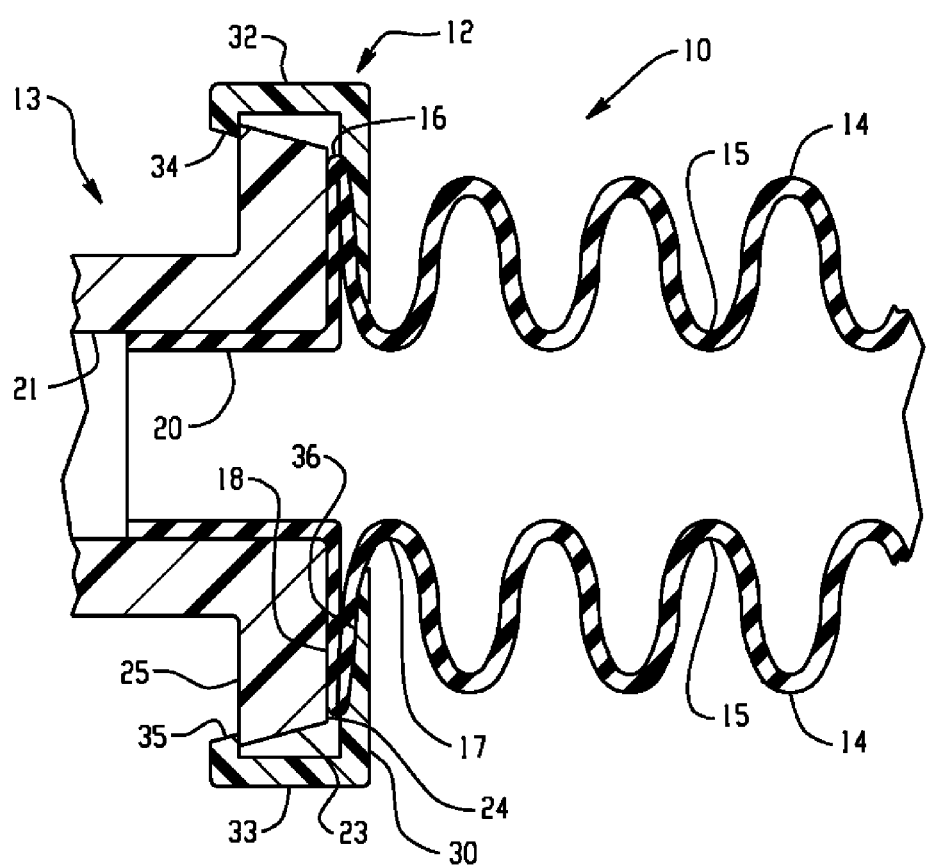
FIG. 4 is a longitudinal sectional view on an enlarged scale taken on the line 4-4 of FIG. 3.

The coupling device includes a latch 12 mounted on the forward end 10 of the tube and a catch 13 associated with the fitting 11. The latch is adapted to be moved into engagement with the catch to place the coupling device in a latched condition as shown in FIGS. 2, 3 and 4.

A coupling device may be used in connection with both ends of the tube, however, for the purpose of this disclosure, only one end of the tube (referred to herein as the "forward end") will be shown and described. The tube, to include the forward end 10, is provided with annular corrugations defined by alternating ridges 14 and grooves 15, the forward end also being provided with a forward most ridge 16 (referred to herein as the "initial ridge") and a forward most groove 17 (referred to herein as the "initial groove"). The initial ridge 16 has a forward facing annular side wall 18 which is adapted for engagement with the fitting 11 as will be described below. Also, the forward end 10 has a cuff 19 that extends from the forward side wall 18 to the respective end of the tube.

Figure 1:
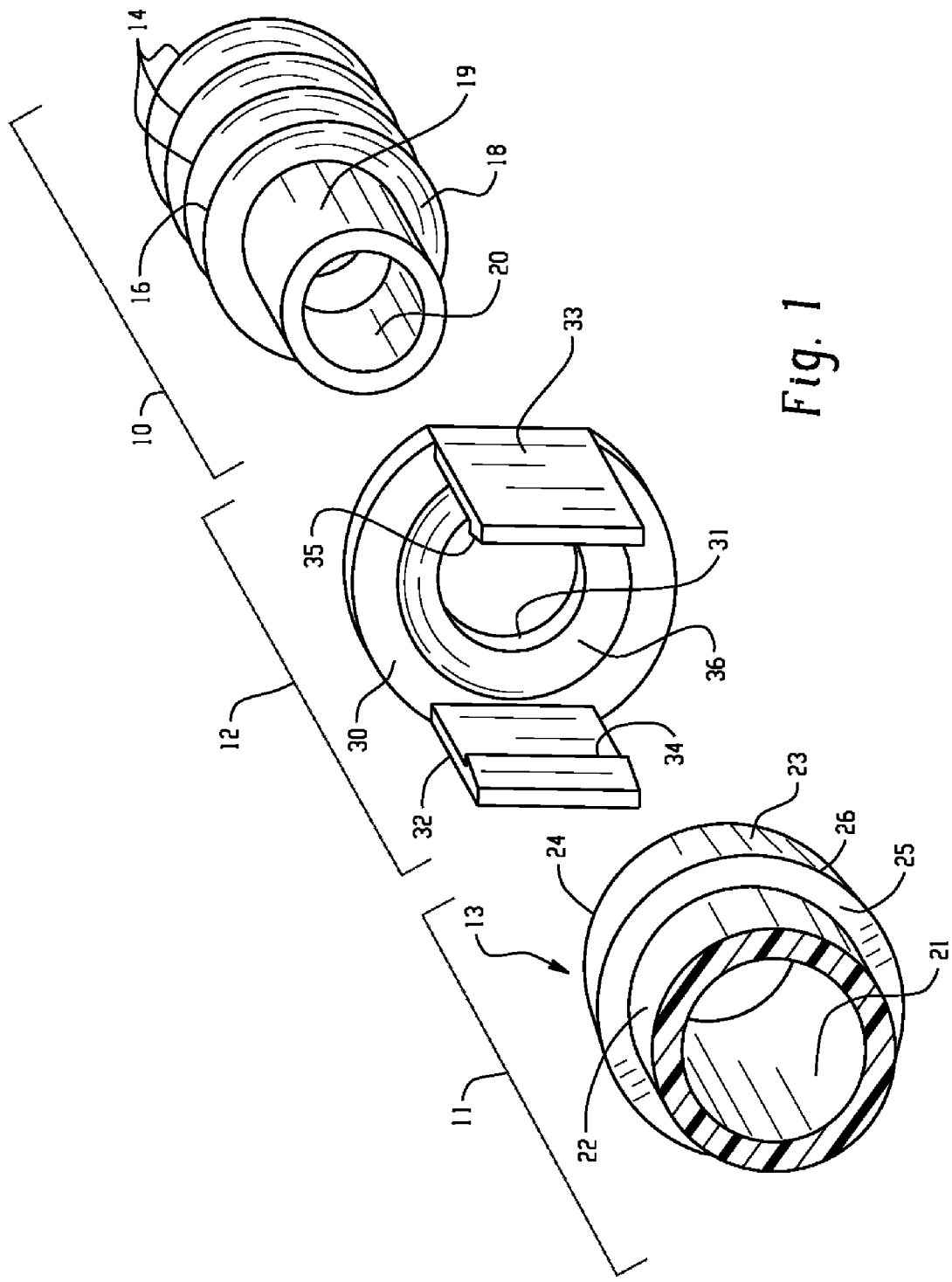
FIG. 1 is an exploded isometric projection with parts broken away, showing an end portion of a flexible tube with annular corrugations and a device for coupling the end portion to a fitting.

The fitting 11 is attached to the equipment with which the tube is to be used and may take many different forms. Accordingly, only that part of the fitting that functions primarily as the catch 13 will be shown and described herein. FIGS. 1 and 4 best illustrate the catch 13 which is designed for engagement with the latch 12. The catch 13 has a tubular portion 22 that defines a passage 21 that aligns with the passage 20 through the tube. Just forward from the tubular portion is a frusto conical surface portion 23 that extends from a smaller diameter annular end face 24 to a larger diameter annular base wall 25. The base wall 25 and the frusto conical surface 24 intersect at an edge 26 that provides a detent for the latch 12.

The latch 12 is secured on the forward end 10 of the tube and is adapted to engage the catch 13 on the fitting 11. The latch 12 is preferably formed of a relatively hard, molded thermoplastic material and includes a disc-like body 30 with a circular opening 31, the opening being of sufficient size and shape to permit the body 30 to be received and retained in the initial groove 17 as best shown in FIG. 4.

The latch 13 is also provided with two arms, 32 and 33, located on opposite sides of the body 30 and extending from the body in the direction of the forward end 10 of the tube. Each arm, 32 and 33, has a latching tooth 34, 35 on its outer end, extending radially inward. The arms are connected to the body 30 in such a way that their outer ends may move between a radially inward relaxed position and a radially outward flexed position.

The operation of the latch 12 and catch 13 serves to secure the forward end 10 of the tube to the fitting 11 in such a way that the forward side wall 18 of the initial ridge 16 presses tightly against the annular end face 24. This is accomplished by securing the latch 12 to the catch 13 simultaneously with the surface-to surface engagement between the side wall and the end face.

When the latch 12 is moved toward the catch 13, the latching teeth 34, 35 engage the frusto conical surface 23. As the movement continues, the outer ends of the arms 32 and 33 are forced outwardly toward their flexed position. When the latching teeth reach the rearward base wall, the force causing the flexing of the arms is relieved as the teeth move inwardly to a detent position best shown in FIG. 4.

The latch 12 and catch 13 are so designed that at the same time that the latching teeth reach their detent position, the forward side wall 18 tightly engages the end face 24 of the fitting 11.

The body of the latch has an annular recess 36 formed in its side that faces forwardly. The recess is adapted to provide a seat for the adjacent side wall of the forward most ridge. This results in an improved fit between the body of the latch and the forward most ridge and groove.

Figure 5:
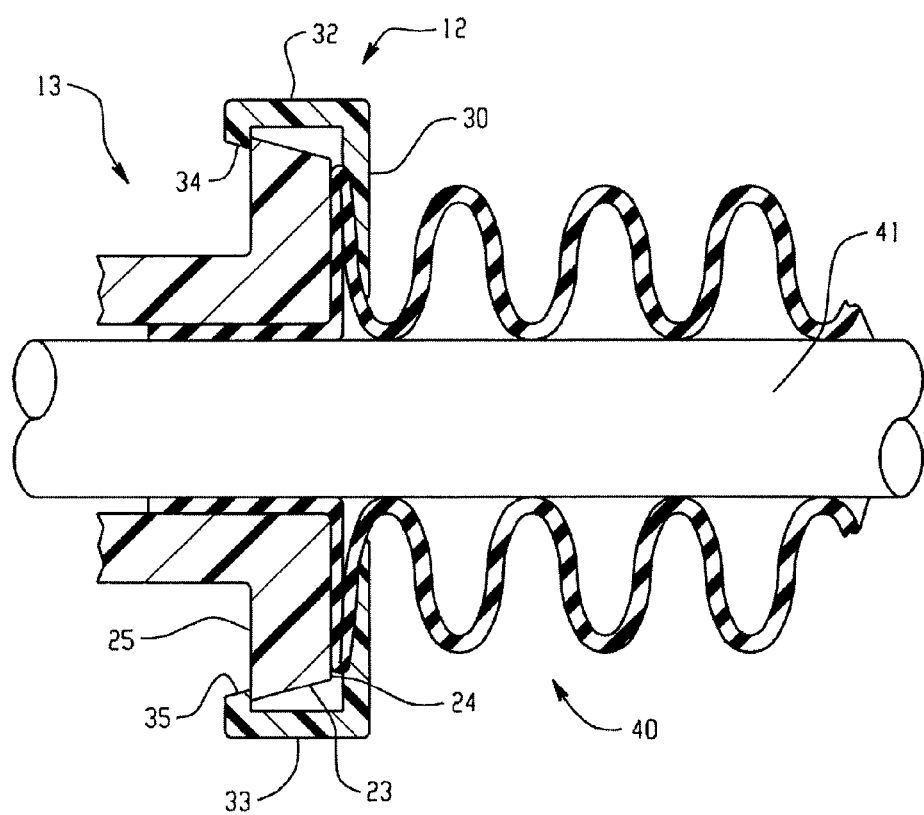
FIG. 5 is a sectional view on an enlarged scale illustrating the process for attaching the latch of the coupling device to the end of the tube

FIG. 5 illustrates the procedure for attaching the latch 12 to the forward end 10 of the tube so that the forward side wall 18 of the initial ridge 16 is relatively flat in accordance with the invention.

During the forming process for the tube, an uncured rubber sleeve 40 with preliminary annular impressions formed thereon in the manner described above, is placed on a curing mandrel 41 in an axially foreshortened condition as shown in FIG. 5. Then the body 30 of the latch 12 is placed in what will become the initial groove 17. A fitting 11, or alternatively, just the part of the fitting that constitutes the catch 13, is positioned on the mandrel 41 and the annular end face 24 of the catch 13 is moved toward what will become the forward side wall 18. At the same time, the latch 12 and catch 13 are moved into latching engagement as shown in FIG. 5. In this condition, the annular end face 24 presses against the uncured rubber of the preliminary forward side wall to keep it in a flattened condition.

Then the mandrel and sleeve with the latch 12 and catch 13 in their latched condition are placed in an oven and heated to cure the sleeve and set the corrugations. At the same time, the portion of the sleeve 40 that becomes the forward side wall 18 of the initial ridge 16 is cured in a flattened condition. After curing is complete, the latch 12 is separated from the catch 13 and the finished tube with the latch thereon is removed from the mandrel.

As a result of this process, the forward side wall 18 remains relatively flat, resulting in improved surface-to-surface contact with the annular end face 14.

While the invention has been shown and described with respect to a specific embodiment thereof, this is intended for the purpose of illustration rather than limitation and other variations and modifications of the specific embodiment herein shown and described will be apparent to those skilled in the art, all within the spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. A device adapted to couple to a fitting having a tubular portion that defines a passage and a catch, the catch including a frustoconical surface portion forward of the tubular portion that extends from a smaller diameter annular end face to a larger diameter base wall, the base wall and the frustoconical surface portion intersecting at an edge, the device comprising:

a flexible tube formed of elastomeric material and having annular corrugations defined by alternating ridges and grooves, said tube having a forward end with an initial ridge and an initial groove, said initial ridge having a relatively flat annular forward side wall, and;

a latch formed of thermoplastic material that is mounted to said forward end of said tube, said latch having a relatively flat body defining an opening through which said forward end of the tube is received such that said body is retained in said initial groove of the tube, and at least two arms attached to and symmetrically spaced around said body, said arms extending toward said forward end of said tube on which said latch is mounted, each of said arms having a latching tooth on its outer end and extending radially inward therefrom, said arms being adapted to move between a radially inward relaxed position and a radially outward flexed position;

wherein when the latch is pressed onto the fitting, said arms are forced radially outward by the frustoconical surface portion of said catch until said latch and said catch reach a limit position whereupon said arms move radially inward to bring said latching teeth past the edge and into latching engagement with said catch, and wherein when said latch is in latching engagement with said catch, said initial ridge is captured between the end face of said fitting and the body of the latch with said forward side wall of said initial ridge being tightly pressed against said end face of said fitting and thereby forming an annular seal.

2. The device according to claim 1, wherein said flexible tube is formed from a sleeve of uncured rubber with preliminary annular impressions formed thereon, said sleeve being placed on a mandrel in an axially foreshortened condition to provide preliminary annular corrugations, said foreshortened sleeve having a preliminary initial groove, and wherein said body of said latch is positioned in said preliminary initial groove, after which said mandrel and sleeve with the latch positioned thereon, are heated to cure the sleeve and set the corrugations with said latch secured thereto.

3. The device according to claim 2, wherein said fitting is placed on said mandrel and said latch is in latching engagement with said catch before said mandrel and sleeve are heated, whereby said latch forces said preliminary forward side wall of said preliminary ridge and said forward end face of said fitting together to press the preliminary forward side wall into a flattened condition during curing, whereby the resulting forward side wall is relatively flat.

\* \* \* \* \*